United States Patent [19] [11] 4,144,575
Schwarz [45] Mar. 13, 1979

[54] APPARATUS FOR DISPENSING FABRIC FROM A BOLT

[75] Inventor: Gail B. Schwarz, Belleville, Ill.

[73] Assignee: The Measuregraph Company, St. Louis, Mo.

[21] Appl. No.: 739,971

[22] Filed: Nov. 8, 1976

Related U.S. Application Data

[60] Division of Ser. No. 560,358, Mar. 20, 1975, Pat. No. 4,004,748, and a continuation-in-part of Ser. No. 477,166, Jun. 6, 1974, abandoned.

[51] Int. Cl.² .................. G06F 15/20; B26D 5/40
[52] U.S. Cl. ................... 364/562; 33/133; 83/208; 242/75.1; 250/560; 364/464
[58] Field of Search .......... 235/151.32, 92 V, 92 PE; 242/62, 67.1 R, 75.1; 83/208, 242, 364; 33/129, 133; 250/559, 560; 364/562, 464, 469, 475, 478, 479

[56] References Cited

U.S. PATENT DOCUMENTS

| 3,202,376 | 8/1965 | Dutro et al. ................. 242/75.1 |
| 3,226,555 | 12/1965 | Miller ........................ 250/560 |
| 3,232,547 | 2/1966 | Thiede et al. ................. 250/560 |
| 3,411,391 | 11/1968 | Drubner ....................... 83/242 |
| 3,452,511 | 7/1969 | Hoffler ........................ 53/219 |
| 3,524,373 | 8/1970 | Helmus, Jr. et al. ............. 33/129 |
| 3,715,944 | 2/1973 | Knechtel et al. ................ 83/58 |
| 3,721,809 | 3/1973 | Strandberg, Jr. et al. ........ 250/560 |
| 3,760,669 | 9/1973 | Rosenthal et al. .............. 83/208 |
| 3,822,624 | 7/1974 | Shoji et al. ................... 83/208 |
| 3,898,469 | 8/1975 | Nichols et al. ................ 235/92 V |
| 3,916,174 | 10/1975 | Moule ....................... 235/151.32 |

FOREIGN PATENT DOCUMENTS 426279 4/1935 United Kingdom.

Primary Examiner—Charles E. Atkinson
Assistant Examiner—Errol A. Krass
Attorney, Agent, or Firm—Koenig, Senniger, Powers and Leavitt

[57] ABSTRACT

Apparatus for dispensing fabric from a bolt in which the bolt is cradled in a loop of an endless belt and unwound by driving the belt. The length of fabric unwound is accurately measured by measuring the distance of belt travel, and provision is made for presetting the length of fabric to be unwound, manually starting the belt to unwind the fabric, automatically starting measurement of the length unwound when the leading end of the fabric passes a predetermined point, and automatically stopping the belt when the preset length has been measured. The fabric unwound from the belt is automatically folded, and presented for being cut.

8 Claims, 15 Drawing Figures

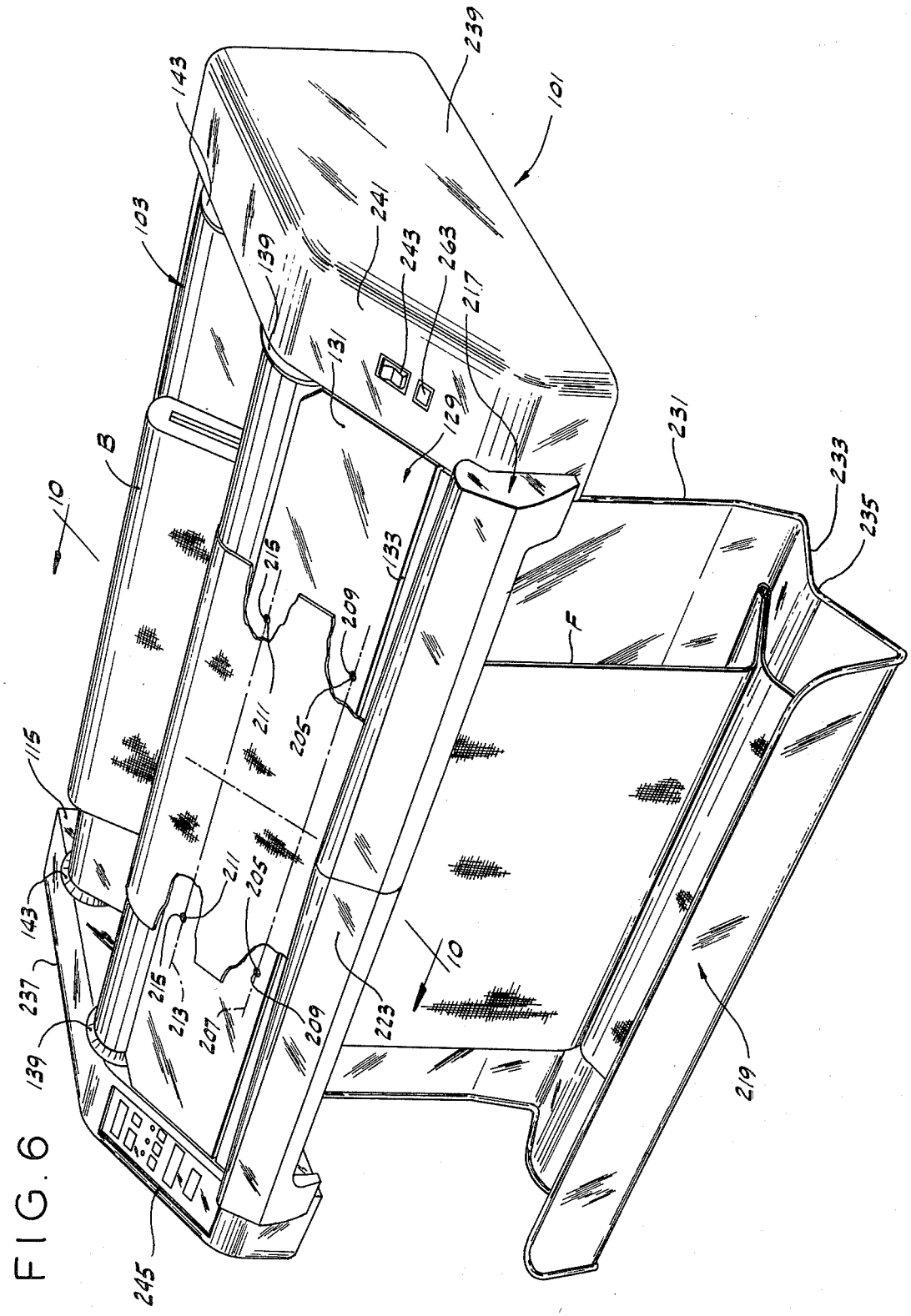

4,144,575

APPARATUS FOR DISPENSING FABRIC FROM A BOLT

CROSS-REFERENCE TO RELATED APPLICATION

This is a division, of application Ser. No. 560,358, filed Mar. 20, 1975, and now U.S. Pat. No. 4,004,748. This application is a continuation-in-part of my copending application Ser. No. 477,166, now abandoned filed Jun. 6, 1974, entitled Apparatus for Measuring and Cutting Lengths of Fabric.

BACKGROUND OF THE INVENTION

This invention relates to apparatus for dispensing fabric from a bolt, and more particularly to apparatus for automatically dispensing a measured length of fabric from a bolt.

The invention is especially concerned with apparatus for unwinding a measured length of fabric from a bolt of the fabric, as distinguished from a roll of the fabric, although the apparatus of this invention is quite capable of handling a roll of fabric as well as a bolt. It will be understood, however, that unwinding fabric from a bolt (as distinguished from a roll) and measuring the length of fabric unwound presents special problems because of the elongate (as distinguished from circular) cross section of a bolt.

SUMMARY OF THE INVENTION

Among the several objects of the invention may be noted the provision of apparatus for dispensing fabric from a bolt particularly for use by sales personnel in retail fabric stores, in the fabric departments of department stores, or elsewhere to supply a customer with a specified length of fabric from a bolt; the provision of such apparatus which automatically unwinds the specified length of fabric from the bolt and presents it for being cut; the provision of such apparatus which measures any preselected yardage of fabric with a high degree of accuracy; the provision of such apparatus which automatically folds the fabric unwound from the bolt; the provision of such apparatus which simplifies the handling of a bolt, eliminating any necessity for chucking the bolt, and considerably reducing the time required for a sales transaction; and the provision of such apparatus adapted smoothly to unwind a bolt despite the elongate cross section of the bolt.

Among the various features of the apparatus is the feature that it comprises an endless belt conveyor and means guiding the conveyor for travel in an endless path including an upwardly opening loop in which a bolt may be cradled with the bolt extending transversely of the conveyor. Means is provided for driving the conveyor to rotate a bolt cradled in the loop to unwind fabric from the bolt. The guiding means comprises a first and a second guide for establishing said loop, the conveyor travelling over the first guide, thence downwardly, upwardly and over the second guide, and the apparatus has means mounting the guides for relative movement toward and away from one another as the bolt rotates, the guides being relatively movable away from one another as the bolt rotates to a horizontal position and toward one another as the bolt rotates away from horizontal position.

Other objects and features will be in part apparent and in part pointed out hereinafter.

BRIEF DESCRIPTION OF THE DRAWINGS

FIG. 6 is a perspective of another embodiment of the invention;

Corresponding reference characters indicate corresponding parts throughout the several views of the drawings.

DESCRIPTION OF THE PREFERRED EMBODIMENTS

Figure 1:
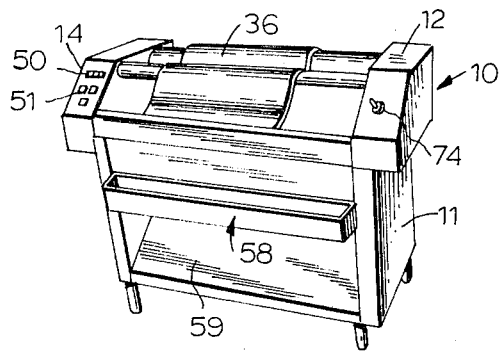
FIG. 1 is a perspective as viewed from the front of apparatus of this invention for dispensing fabric from a bolt.

Referring now to the drawings, wherein corresponding reference numerals indicate corresponding parts throughout the several views, reference numeral 10 generally designates a fabric measuring and cutting apparatus in accordance with the present invention positioned on a stand 11. The machine has at opposite ends housings 12, 14 enclosing inner side walls 16, 18.

Figure 2:
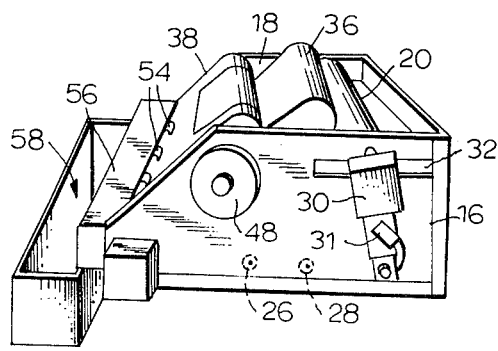
FIG. 2 is a perspective of the upper part of the FIG. 1 apparatus as viewed from the right side with a housing removed.
Figure 3:
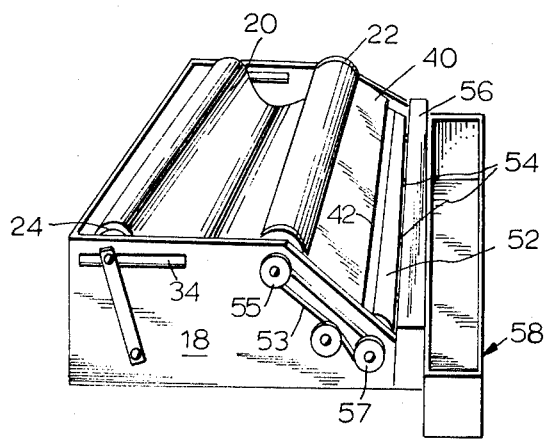
FIG. 3 is a perspective similar to FIG. 2 but viewed from the left side of FIG. 1 and with the bolt of fabric removed.
Figure 7:
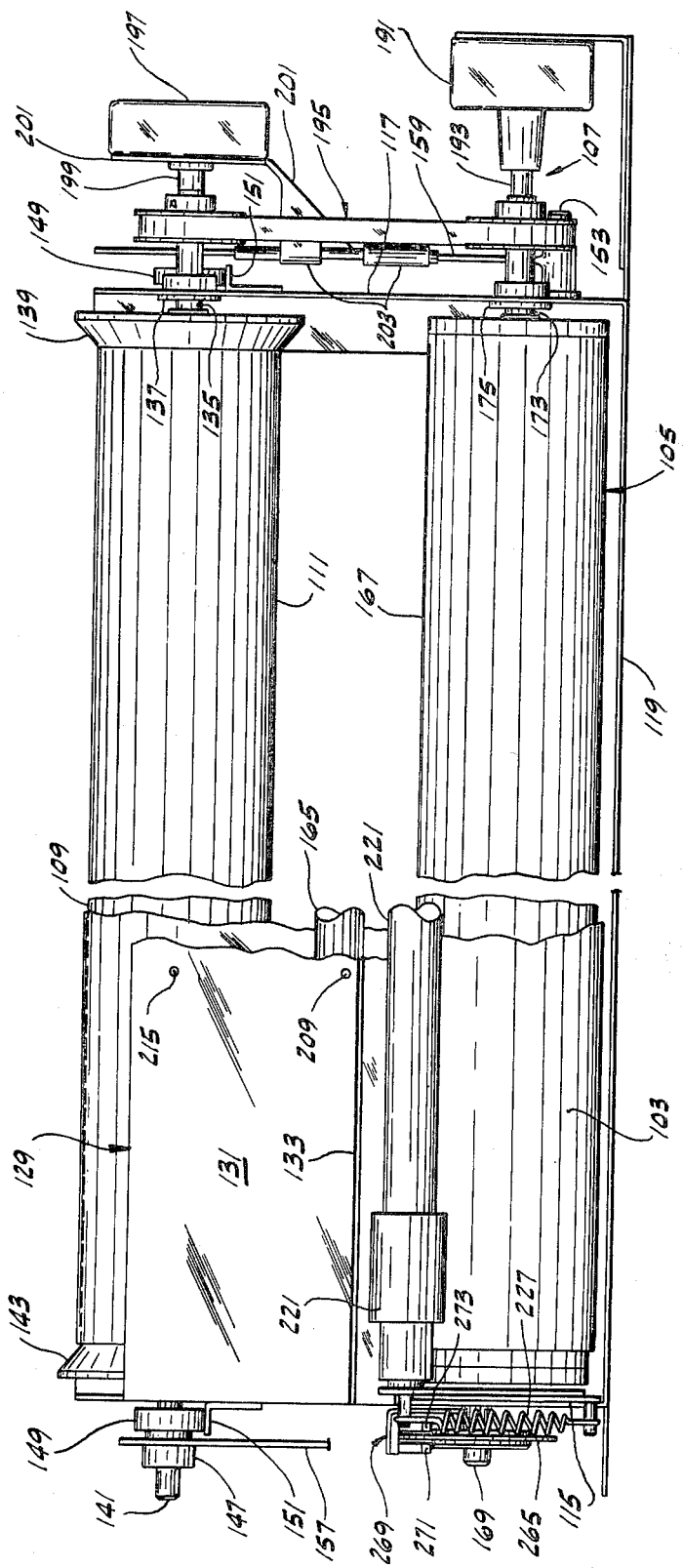
FIG. 7 is a front elevation of the FIG. 6 embodiment with parts removed and parts broken away.
Figure 8:
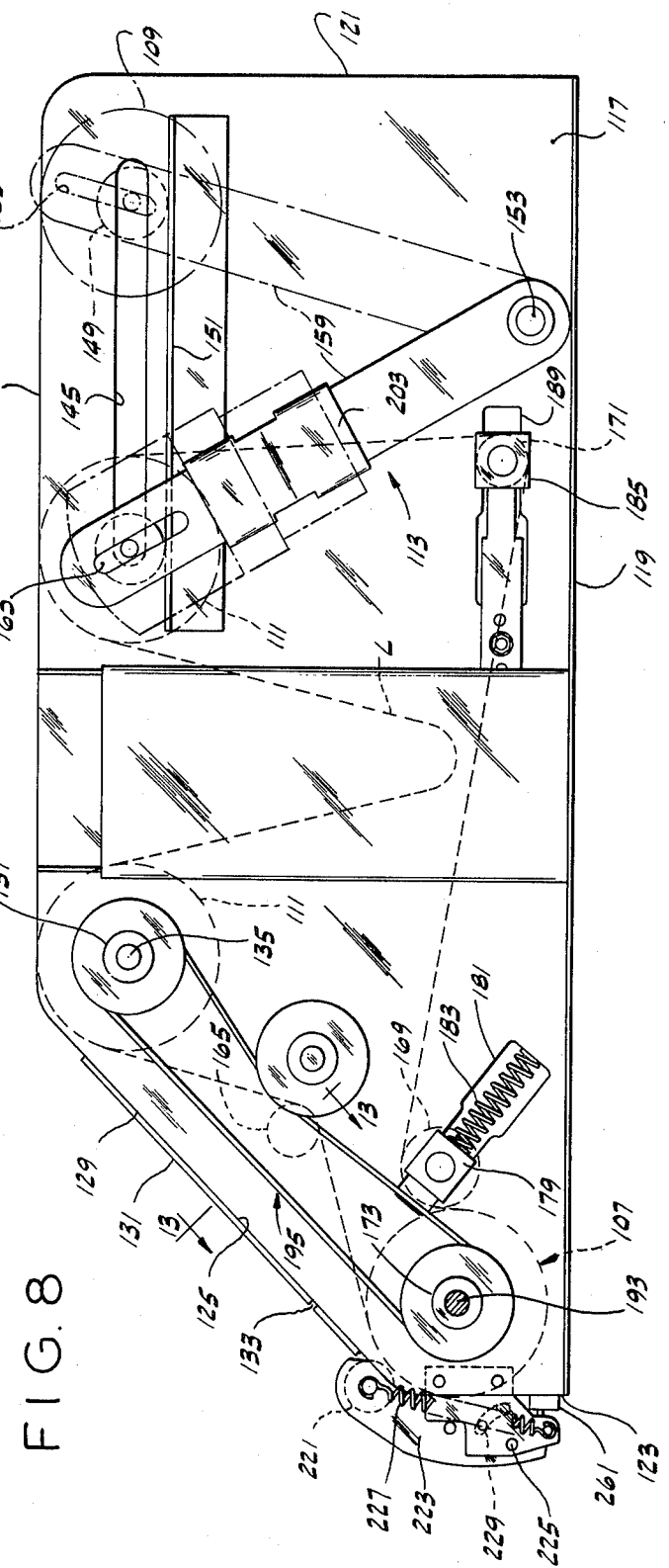
FIG. 8 is a right side elevation of FIG. 6 with a side cover removed.

Referring to FIGS. 2 and 3, a transport belt 20 is trained about an upper front roller 22, an upper rear roller 24, and a pair of smaller lower rollers 26, 28. Transport belt 20 is preferably a driven belt. For this purpose, a motor 30 is in driving engagement with the shaft of upper rear roller 24. The ends of the rear upper roller are slidable within horizontal slots 32, 34 in side walls 16, 18. A change in the position of the rear roller changes the amount of tension applied to the transport belt and the depth of the sling or loop in the belt between upper rollers 22, 24. Motor 30 is mounted on an arm 31 whose lower end is pivotally connected to wall 16.

A bolt of fabric 36 which has an oblong configuration and in cross section resembles a rectangle with rounded corners is supported in the upper pass of transport belt 20 between rollers 22 and 24 as best seen in FIG. 2. A portion of the fabric is shown in FIG. 2 as having been manually pulled off of bolt 36 over front top roller 22 downwardly onto a cutting table 40. The cutting table, which is disposed at the front of the machine, is inclined downwardly and outwardly at an approximately 45° angle.

Figure 4:
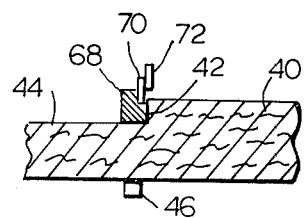
FIG. 4 is a vertical section showing part of an inclined cutting table and a cutting device.

Referring to FIG. 4, adjacent the lower edge of table 40 there is a small step-like notch 42 which juts downwardly from the surface of table 40 and terminates in the table edge section 44 which is parallel to but offset from the remainder of table 40. The table is translucent and a series of photocells 46 are disposed beneath notch 42 in a position to sense the passage of fabric past notch 42. Passage of fabric 36 past the photocells causes a change in light intensity in the sensors. This signals a beginning count to an optical encoder which in the illustrated embodiment is a transparent disc 48 (FIG. 2). A plurality of small, dark segments are disposed around the circumference of disc 48 positioned to interrupt a light beam. Depending upon the geometry of the unit, a given number of interruptions will correspond to a suitable unit of measurement, for example, a linear measurement of 1/16 inch. The encoder is preferably connected to motor 30 so that the advance of the fabric may be stopped automatically at the desired length. This measurement is shown on a register 50 in the front of housing 14. Preferably the desired length and price information may be fed to a computer via buttons 51 and the price of the desired piece of fabric computed and shown on register 50.

The fabric, which has moved beyond notch 42, passes through a nip between a discharge roller 52 at the bottom of edge 44 of the table and a series of small, spring-loaded pinch rollers 54 which are supported within a rectangular housing 56 at the front of the machine. Roller 52 may be rotated via a drive belt 53 (FIG. 3) which is trained about a pulley 55 on the shaft of upper front roller 22 and a pulley 57 on the shaft of roller 52. Thereafter the fabric falls into a folding bin 58.

Figure 5:
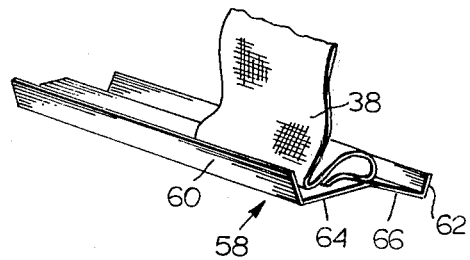
FIG. 5 is a perspective of a folding bin of the apparatus.

As seen in FIG. 5, bin 58 has longitudinal walls 60, 62, and a bottom comprised of upwardly and inwardly inclined sections 64 and 66 which meet at a peak. The fabric falls into the bottom of the bin in overlapping folds as depicted in FIG. 5.

Referring again to FIG. 4, when the desired length of fabric has passed notch 42 as determined by the optical encoder, the fabric is cut along the upper edge of notch 42 which functions as a cutting edge. The fabric may be cut by means of specially designed scissors having blades 70 and 72 which are conventional, with a guide foot 68 attached to the lower scissor blade 70. As shown in FIG. 4, guide foot 68 has a height somewhat greater than the height of notch 42 so that with the bottom of the foot resting on edge 44 of the table, the cooperating scissor blades 70 and 72 will cut the fabric at the upper edge of notch 42. In this fashion, a straight cut across the fabric is obtained and the foot keeps the cutting edge off the table surface.

A shelf 59 beneath bin 58 may be used for storage of bolts of fabric.

In operation, a bolt of fabric selected by the customer is placed into the sling of transport belt 20 between the two upper rollers 22, 24. The desired length and cost of fabric is fed to the computer by buttons 51. The free edge of the fabric is draped onto the inclined table, and the motor for driving the transport belt is actuated in simple fashion via a control button 74 on housing 12. As fabric is advanced past the cutting edge, the photocells signal a beginning count to the encoder, and the length and cost of the fabric passing the cutting edge is displayed by register 50. As fabric is removed from the bolt, the bolt may tumble over within the sling with the flexible transport belt absorbing this movement and accommodating it by movement of the shaft of rear roller 24 within slots 32, 34. The withdrawn fabric tumbles into folding bin 58 where it is folded over upon itself.

When the desired length of fabric has been withdrawn past the cutting edge, motor 30 is automatically turned off. Then the fabric is cut by hand along the cutting edge employing the scissors as described hereinabove. The pinch rollers 54 maintain the upper edge of the severed section of the fabric against roller 52 so that the fabric is still visible to the customer until the fabric is withdrawn from the machine in folded condition which facilitates its packaging.

FIGS. 6–15 illustrate a later embodiment of the apparatus of this invention for dispensing fabric from a bolt B. The FIGS. 6–15 apparatus, which is designated in its entirety by the reference numeral 101, is a table or counter top model, which may also be referred to as a console model, adapted to be placed on top of a table or counter in the retail fabric store. Similarly to the FIGS. 1–5 embodiment, it comprises an endless belt conveyor 103 (corresponding to the belt 20) and means 105 guiding this conveyor for travel in an endless path including an upwardly opening loop L in which a bolt B may be cradled with the bolt extending transversely of the conveyor. Means indicated generally at 107 is provided for driving the conveyor to rotate a bolt B cradled in the loop to unwind fabric from the bolt. The guiding means includes upper rear roll 109 (corresponding to roller 24) and an upper front roll 111 (corresponding to roller 22) acting as first and second guides for establishing the loop L, the conveyor travelling over the first guide (the rear roll 109) thence downwardly, upwardly and over the second guide (the front roll 111). Means indicated generally at 113 (see FIG. 8) mounts these guides for relative movement toward and away from one another as the bolt rotates, the loop L changing shape as the bolt rotates from a generally V-shape with one of the faces of the bolt engaging one leg of the V (see FIG. 10 or 12) on the inside of said leg to a flat-bottomed shape with one of the faces of the bolt engaging the flat bottom (see FIG. 11).

More particularly, the mounting means 113 for the rolls 109 and 111 comprises left and right side panels 115 and 117 extending up from a bottom panel 119 adapted to rest on a table or counter. Each side panel has a vertical rear edge 121, a vertical front edge 123 of lesser height than the rear edge, and an inclined edge portion 125 extending up and back from the upper end of the front edge to a horizontal upper edge 127. An inclined panel 129, which may be referred to as the sensor panel, extends between the side panels 115 and 117 at their inclined edges 125. This sensor panel, which may be formed of wood with a suitable plastic upper face 131, slopes downwardly and forwardly at the front of the apparatus, and has a slot or groove 133 in its upper face extending from one end of the sensor panel to the other adjacent its front (lower) edge. The guides or rolls 109 and 111 are located in a generally horizontal plane at the top of the space bounded by the side panels 115 and 117 and the sensor panel 129, with the upper rear roll 109 (the first guide) being movable generally horizontally toward and away from the upper front roll 111 (the second guide). The upper front roll 111 is secured on a shaft 135 journalled in bearings 137 in the side panels adjacent the forward ends of the top edges 127 of the side panels and has frustoconical end heads 139 for maintaining the belt conveyor 103 centered in respect to the roll. The upper rear roll 109 is secured on a shaft 141 having frustoconical end heads 143 for belt centering purposes. At its ends, this shaft extends through horizontal slots 145 in the side panels 115 and 117, these slots being located adjacent the upper edges 127 of the side panels and extending from adjacent the rear edges 121 of the side panels toward the front. The shaft 141 is journalled in bearings such as indicated at 147 on the outside of the side panels, these bearings having rollers such as indicated at 149 which roll on tracks 151 on the outside of the side panels. The shaft 141 is slidable forward and rearward in the slots 145 (and rotatable on its axis as it slides), its ends being constrained to move forward and rearward in unison without canting of the shaft by means of a horizontal torsion shaft 153 journalled in bearings 155 in the side panels 115 and 117 adjacent their bottom edges below the slots 145 and arms 157 and 159 on the left and right ends of the shaft extending up on the outside of the panels slidably interconnected with the bearings 147 via slots in the arms as indicated at 161 for arm 157 and 163 for arm 159.

The conveyor 103 may be of any belt material which is capable of good frictional contact with fabric on a bolt, including the usual woven and knit textile fabrics such as are sold in retail fabric stores. One type of belt material that has been used is a nylon or nylon and rayon combination fabric having ribs extending longitudinally with respect to the direction of belt travel, the mateial being about 0.030 inches thick. In addition to being trained over the upper rear roll 109 and upper front roll 111 with the loop L between these rolls, the belt 103 is trained under an idler roll 165, around a lower front roll 167, up and over a measuring roll 169 which presses it against the lower front roll, and under and around an adjustable lower rear roll 171. The lower front roll 167 is secured on a shaft 173 journalled for rotation in bearings 175 in the side panels 115 and 117 on a horizontal axis extending transversely of the apparatus adjacent the upper end of the front edges 123 of the side panels and the lower end of the inclined edge portions 125 of the side panels. This lower front roll is preferably generally of the same diameter (relatively large diameter) as the rolls 109 and 111. The idler roll 165 is located generally midway between the upper front roll 111 and the lower front roll 167, being mounted for rotation as indicated at 177 in FIG. 13 on a horizontal axis extending transversely of the apparatus in the inclined plane of the axes of rolls 111 and 167 on brackets extending down from the ends of the sensor panel 129. It lies below and toward the rear of the sensor panel. The measuring roll 169 is journalled in bearings 179 which are slidable in inclined slots 181 in the side panels 115 and 117 and biased in the direction toward the lower front roll 167 by springs 183. The slots 181 are located rearward of the lower front roll 167 and inclined upwardly in forward direction with their inclined plane tangent to the roll 167 adajcent the top of this roll. The lower rear roll 171 is journalled in bearings 185 which are adjustable as indicated at 187 in horizontal slots 189 in the side panels 115 and 117 adjacent the rear of the apparatus and below the slots 145. From the loop L, the conveyor belt 103 passes up, over and around the upper front roll 111, thence down and under the idler roll 165, thence forward, over and around the lower front roll 167, thence up and over the measuring roll 169 and back to and under the lower rear roll 171, thence up to the rear of the upper rear roll 109, and forward over the upper rear roll and down into the loop L. Between rolls 111 and 167, the conveyor belt 103 travels behind and underneath the sensor panel 129, this panel extending downwardly and forwardly from the upper front roll 111.

The means 107 for driving the conveyor comprises an electric motor 191 mounted on the outside of the right side panel 117. This motor is a conventional gearmotor (having a built-in set of speed reduction gears) and has its output shaft 193 directly coupled to the right end of the lower front roll shaft 173 positively to drive the lower front roll 167. Motor 191 preferably is one having a conventional positive brake operable on deenergization of the motor positively to stop its shaft 193. The motor is adapted to be energized to drive the roll 167 in the direction for forward belt travel (which is in the direction of the arrows in FIGS. 10-12). The upper front roll 111 is also positively driven by the motor 191 (and positively braked by the brake of motor 191 when the motor is deenergized) via a belt and pulley drive 195 from the shaft 193, this drive being such as to rotate the upper front roll 111 at the same speed as the lower front roll 167. Separate means is provided for positively driving the upper rear roll 109, this means comprising an electric gearmotor 197 slidably mounted on the right-hand side arm 159 with its output shaft 199 directly coupled to the upper rear roll shaft 141. Motor 197 preferably is one having a conventional friction brake operable on deenergization of the motor to stop its shaft 199. Motor 197 is mounted on a bracket 201 having a guide 203 slidably receiving the arm 159, the arrangement being such that as the arm 159 swings back and forth, it slides up and down in the guide 203.

The groove 133 in the sensor panel 129 is adapted to receive and guide a cutting instrumentality, e.g., a pair of scissors, for cutting fabric extending down over this panel on a line extending transversely across the fabric. Just above the groove 133 the sensor panel 129 is provided with a pair of holes 205 on opposite sides of the central longitudinal plane of the apparatus. These holes are centered on a line 207 extending transversly of the apparatus parallel to the groove 133 and closely adjacent to the groove (e.g., spaced 7/32" inch from the upper edge of the groove). Pocketed in each of these holes 205 is a photocell 209 receptive of ambient light and functioning when the ambient light is cut off by the leading edge of fabric being unwound from a bolt to trigger a measuring operation as will appear. The sensor panel 129 is further provided with a pair of holes 211 on opposite sides of the central longitudinal plane of the apparatus centered on a line 213 adjacent and parallel to the upper edge of the panel. Pocketed in each of these holes is a photocell 215 receptive of ambient light and functioning when the ambient light is cut off by fabric overlying the holes 211 to enable a dispensing operation as will appear.

Figure 10:
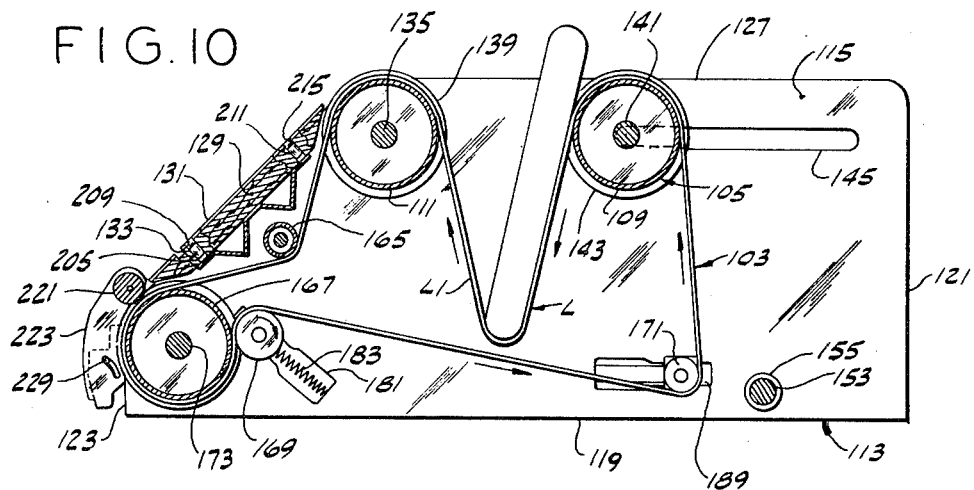
FIG. 10 is a longitudinal section on line 10—10 of FIG. 6, on a reduced scale.
Figure 11:
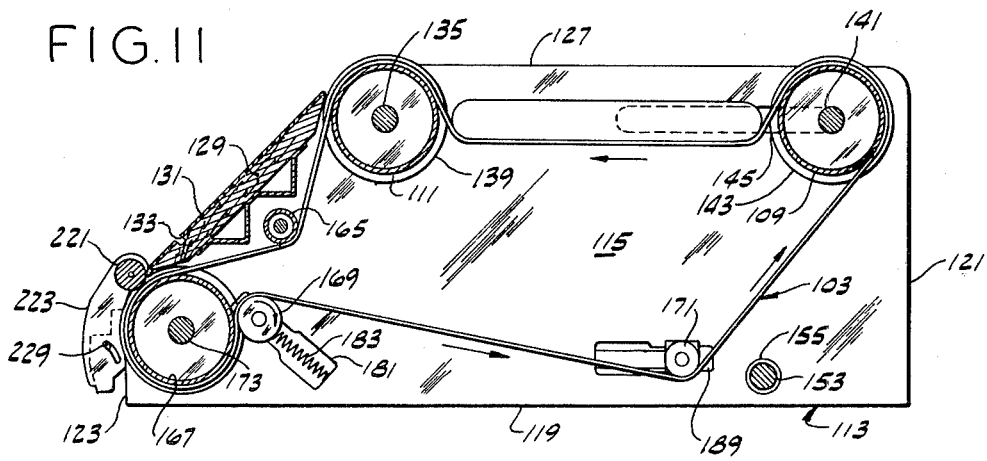
FIGS. 11 and 12 are sections similar to FIG. 10 showing moved positions of a bolt as it is unwound.
Figure 12:
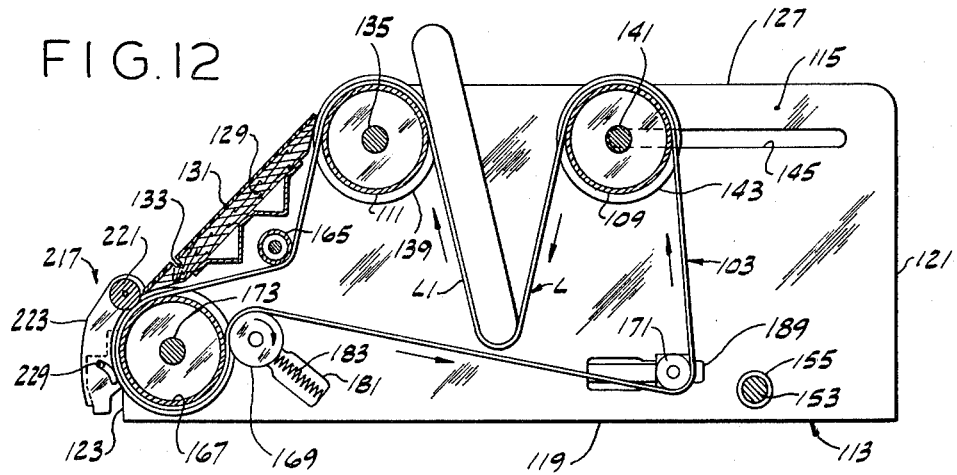
Figure 13:
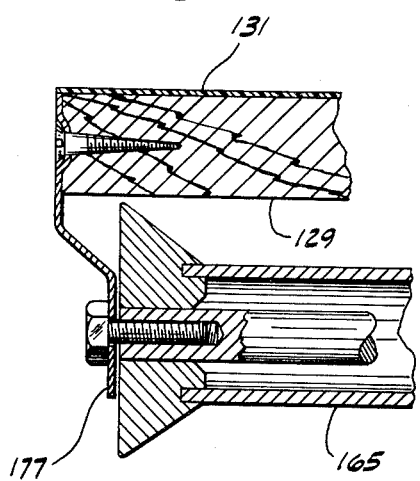
FIG. 13 is an enlarged section on line 13—13 of FIG. 8.

Fabric F is dispensed from a bolt B by cradling the bolt in the loop L of the conveyor belt 103, and driving the conveyor belt 103 in the direction of the arrows shown in FIGS. 10-12 to rotate the bolt clockwise as viewed in FIGS. 10-12 thereby to unwind fabric from the bolt. The fabric travels up on the inside of the forward leg (specially designated L1) of the loop L, passes over and downwardly around the upper front roll 111 on the conveyor belt 103, then separates from the conveyor belt 103 and passes down over the sensor panel 129 to the lower front roll 167, where it meets the conveyor belt 103 again and travels down between the conveyor belt and means 217 for pressing the fabric against the conveyor belt at the lower front roll 167 to a fabric folder 219 (FIG. 6). The means for pressing the fabric against the conveyor belt at roll 167 comprises a presser roll 221 carried by a hood 223 pivoted as indicated at 225 for swinging movement of the roll 221 toward and away from the roll 167. The hood 223 extends across the front of the apparatus convering the lower front roll 167, and is biased by an overcentering spring 227 either toward or away from roll 167. It is engageable with the belt 103 just below the lower edge of the sensor panel 129. Its outward swing is limited by a pin and slot arrangement indicated at 229.

The fabric folder 219 comprises a panel 231 extending downwardly from the front of the bottom panel 119 formed to provide a fabric accumulating pan 233 at its lower end with the bottom of this pan of inverted V-section. The apex of the inverted V is indicated at 235; it is located generally in the vertical plane of the front of the roll 167. Fabric travels down from the roll 167 generally in the vertical plane of the apex 235 of the V and is laid in the pan in folds as appears in FIG. 6. The apparatus is adapted to be placed on a table or counter with panel 231 hanging down below the top of the table or counter at an edge of said top.

A cover 237 is applied to the left side panel 115 and a cover 239 is applied to the right side panel 117. The right side cover 239 has an inclined front panel 241 in which is mounted an on-off switch 243. The left side cover 237 has an inclined front panel 245 in which is mounted a control unit comprising means 247 for presetting a predetermined length of fabric to be dispensed, means 249 for setting the price of the fabric to be dispensed, a display 251 for indicating the length dispensed (in yards and eights of a yard), and a display 253 for indicating the total price of the yardage dispensed. Means 247, which may be referred to as the yardage preset means, comprises a set of thumbwheel switches for presetting the yardage to be dispensed (e.g., the yardage requested by a customer) in increments of one-eight of a yard up to nineteen and seven-eights yards, for example. Thus, this means may comprise three thumbwheel switches, one having eight settings for the one-eighth yard setting, the other two being adapted for settings from zero to forty-nine. Means 249, which may be referred to as the price setting means, comprises a set of thumbwheel switches for setting the price per yard up to $49.99, for example. Thus, means 249 may comprise four thumbwheel switches for effecting such price setting. The control unit also comprises a push button switch 255 for effecting calculation of the total price of the yardage to be dispensed (before dispensing it) and an associated signal light 255a; a second push button switch 257 for effecting dispensing of the fabric without calculating the price (e.g., for inventory purposes) and an associated signal light 257a; and a third push button switch 259 for effecting dispensing of the fabric with price calculation and an associated signal light 259a. At 261 is indicated a switch controlled by the hood and at 263 is indicated a manually operable switch which is referred to as the "pause" switch.

Secured on the left end of the measuring roll 169 is an optically encoded disk 265. This disk is made of light-transmitting material such as a suitable plastic, the encoding thereon comprising a circular series of opaque areas or marks 267 extending around the margin of the disk. The spacing of these marks is such, for example, that sixty-four marks correspond to one-eighth yard of belt travel (and hence one-eighth yard of fabric). Monted on the outside of the left side panel 115 is a pulse generator 269 comprising a light source 271 for beaming a ray of light through the margin of the disk and a light detector 273 for receiving the light from the source, the arrangement being such that, as the encoded margin of the disk passes between light source 271 and light detector 273, the light is alternately transmitted through the disk and interrupted by the opaque marks to cause light detector 273 to generate pulses, one for each mark passing between the source and the detector, thus generating sixty-four pulses per one-eighth yard of fabric.

Figure 15:
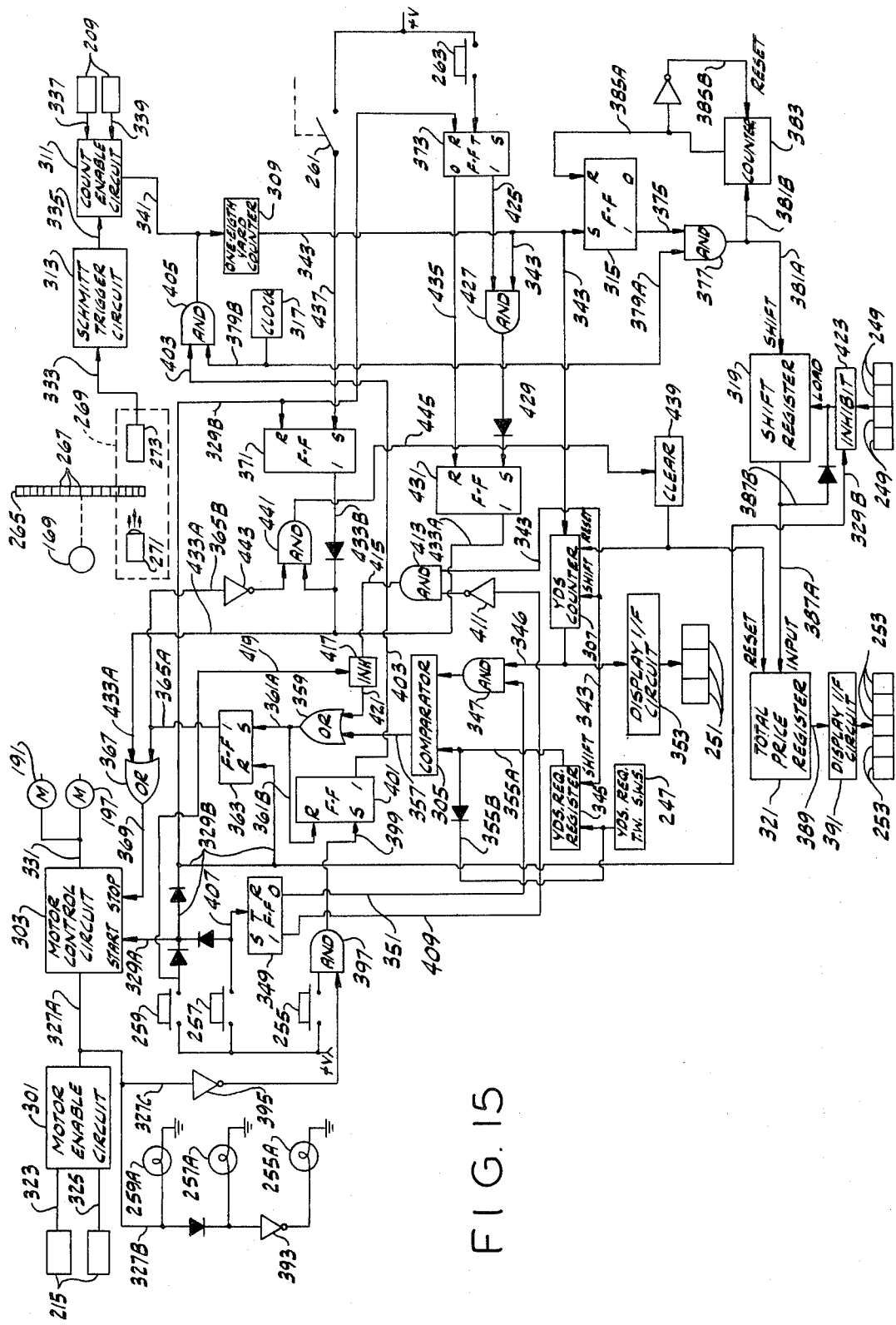
FIG. 15 is an electrical circuit diagram.

As shown in FIG. 15, the supply of power to both of the motors 191 and 197 for driving the belt 103 is under control of a motor enable circuit 301 and a motor control circuit 303. The output of the motor enable circuit 301 is dependent upon inputs from the upper photocells or ambient light sensors 215, pocketed in panel 129. The motor control circuit 303 requires both an enabling input from circuit 301 and a start signal in order to supply power to the motors. Typically, the start signal is supplied, after the yardage preset means 247 and price setting means 249 have been set, by actuating the push button switch 259 (to dispense a preset yardage with price calculation). The dispensing, once initiated, is controlled by a comparator circuit 305 which compares the preset yardage with the output of a counter 307 which counts the number of yards dispensed, in terms of one-eighth yard increments, as determined by the rotation of the optically encoded disk 265. The input to the counter 307 is from the output of a one-eighth yard counter 309, and the output of the counter 307 is displayed (in yards and one-eighth yards) at 251. The one-eighth yard counter 309 is supplied by a count enable circuit 311 which receives input pulses from a Schmitt trigger circuit 313 and enabling pulses from the lower photocells or ambient light sensors 209 in panel 129. The input to the Schmitt trigger circuit is derived from the pulse generator 269 (which comprises light source 271 and light detector 273) in response to the rotation of disk 265.

Calculation of the total price of the yardage dispensed is initiated by supplying each output of counter 309 to a flip-flop 315. The output of flip-flop 315 coupled with pulses provided by a clock 317 are used to shift the contents of a shift register 319 to a total price register 321. The contents of shift register 319 are determined by the setting of the price setting means 249. The total price register 321 includes an adder circuit or combining binary bits shifted from register 319 with the prior contents of the total price register 321 and a register for storing the result of each addition. The contents of the total price register 321 are displayed at 253 on control unit 245.

Figure 14:
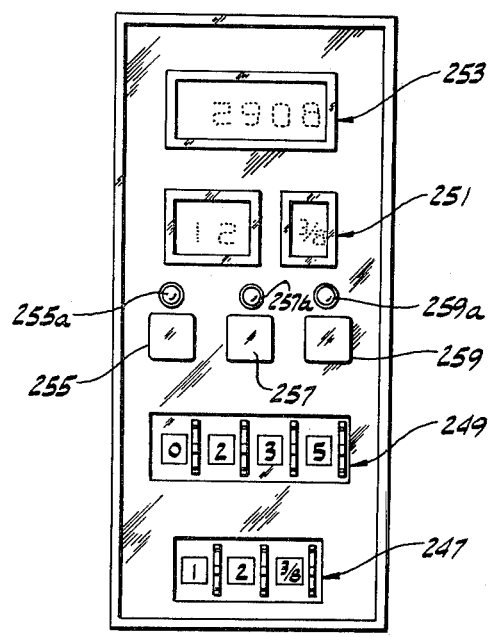
FIG. 14 is a plan of a control unit of the apparatus including a yardage preset means, a price setting means, a yardage display, a price display, and certain push button switches.

The motor enable circuit 301 is such that it does not provide an enabling input to motor control circuit 303 unless both upper light sensors 215 in panel 129 are covered by the leading end portion of the fabric to be dispensed. This prohibits feeding of fabric by mistake under (instead of over) the upper (rear) edge of the sensor panel 129. After the leading end portion of the fabric drawn from a bolt B placed in the loop L is laid on panel 29 extending down far enough to block passage of light to the upper light sensors 215, these sensors supply inputs via lines 323 and 325 to the motor enable circuit 301, to cause an enabling output to be supplied via line 327A to the motor 303. The stated enabling output is also supplied via line 327B to the signal light 259A to illuminate this signal light to inform the sales clerk that she may start the dispensing of the fabric by actuating the push button switch 259. Before actuating switch 259, the clerk sets the thumbwheel switches of the yardage preset means 247 to the yardage requested by the customer, and sets the thumbwheel switches of the price setting means 249 to the price per yard of the particular fabric which has been selected by the customer. As illustrated in FIG. 14, the yardage preset means 247 has been set for dispensing 12⅜ yards and the price setting means has been set for a price of $2.35 per yard.

Upon actuation of the push button switch 259, a signal is supplied via line 329A to the start input of the motor control circuit 303. With the enable input already supplied to the motor control circuit 303 from the motor enable circuit 301 via line 327A, circuit 303 supplies power via line 331 to energize both the belt driving motors 191 and 197 and deactuate their brakes. The motors thereupon drive the belt 103 in the direction of the arrows shown in FIGS. 10–12 to rotate the bolt B in the loop L clockwise as shown in FIGS. 10–12 and unwind the fabric F from the bolt to deliver the preset yardage. With the sensor panel 129 inclined as shown, the leading end portion of the fabric moves downwardly by gravity over the panel to the point it is caught in the nip of rolls 221 and 167, whereupon these rolls positively feed the fabric downwardly to the bin 219.

The rotation of the bolt B to unwind the fabric results from frictional engagement of the bolt with the belt 103 in the loop L. As shown in FIG. 10, the bolt is leaning back against rear roll 109 with the generally flat rear face of the bolt in frictional engagement with the rear leg of the V of the loop L of the belt. As the belt travels down in the rear leg of the V and up in the forward leg of the V, the fabric is fed up off the lower edge of the bolt and up on the inside of the front leg of the V and thence around with the belt over the top of the front roll 111 and down over the sensor panel 129. The bolt is rotated and passes from the inclined position of FIG. 10 leaning back against the rear roll 109 to the horizontal position of FIG. 11, thence to the inclined position of FIG. 12 leaning forward against the front roll 111, and then tips back to its FIG. 10 position and repeats a revolution. The loop L changes shape as the bolt rotates from the V-shape of FIG. 10 and FIG. 12 to the shallow flat-bottomed shape of FIG. 11, and thence back to the V-shape of FIGS. 10 and 12. As shown in FIG. 10, the shaft 141 of the upper rear roll 109 is at the forward ends of the slots 145, and this provides the necessary length of belt 103 between the upper rear roll 109 and the upper front roll 111 (i.e., the necessary slack in the belt between these rolls) to establish the V-shape of the loop. As the bolt rotates clockwise from its FIG. 10 position, the upper rear roll 109 moves back away from the upper front roll 111 as enabled by shaft 141 moving rearward in the slots 145, and this takes some of the slack out of the belt between the rolls 109 and 111 for the change in shape of the loop L to its shallow flat-bottomed shape of FIG. 11. Then, as the bolt continues to rotate clockwise from its FIG. 11 horizontal position, the upper rear roll 109 moves forward toward the upper front roll 111 to its FIG. 12 (and FIG. 10) position to re-establish the relatively deep V shape of the loop L.

As the bolt B rotates to unwind the fabric F, contact between the bolt and belt 103 is constantly maintained so that there is a one-to-one ratio between belt travel and the length of the fabric unwound. Thus, for a belt travel of ten yards, ten yards of fabric are unwound. As to the constant contact, it will be observed that, as shown in FIG. 10, the rear face of the bolt is in contact with the rear leg of the V of the loop L of the belt. This face of the bolt remains in contact with the rear leg of the V as the rear roll 109 moves rearward and the V becomes shallower. It becomes the bottom face of the bolt when the bolt reaches the horizontal position of FIG. 11 and continues in contact with the flat bottom of the loop L. It then becomes the front face of the bolt and continues in contact with the front leg of the V to the FIG. 12 condition, whereupon the bolt gently and smoothly tips back or flops over to its FIG. 10 position without breaking contact of the bolt with the belt at the bottom of the bolt, and then the bolt starts through another revolution.

Figure 9:
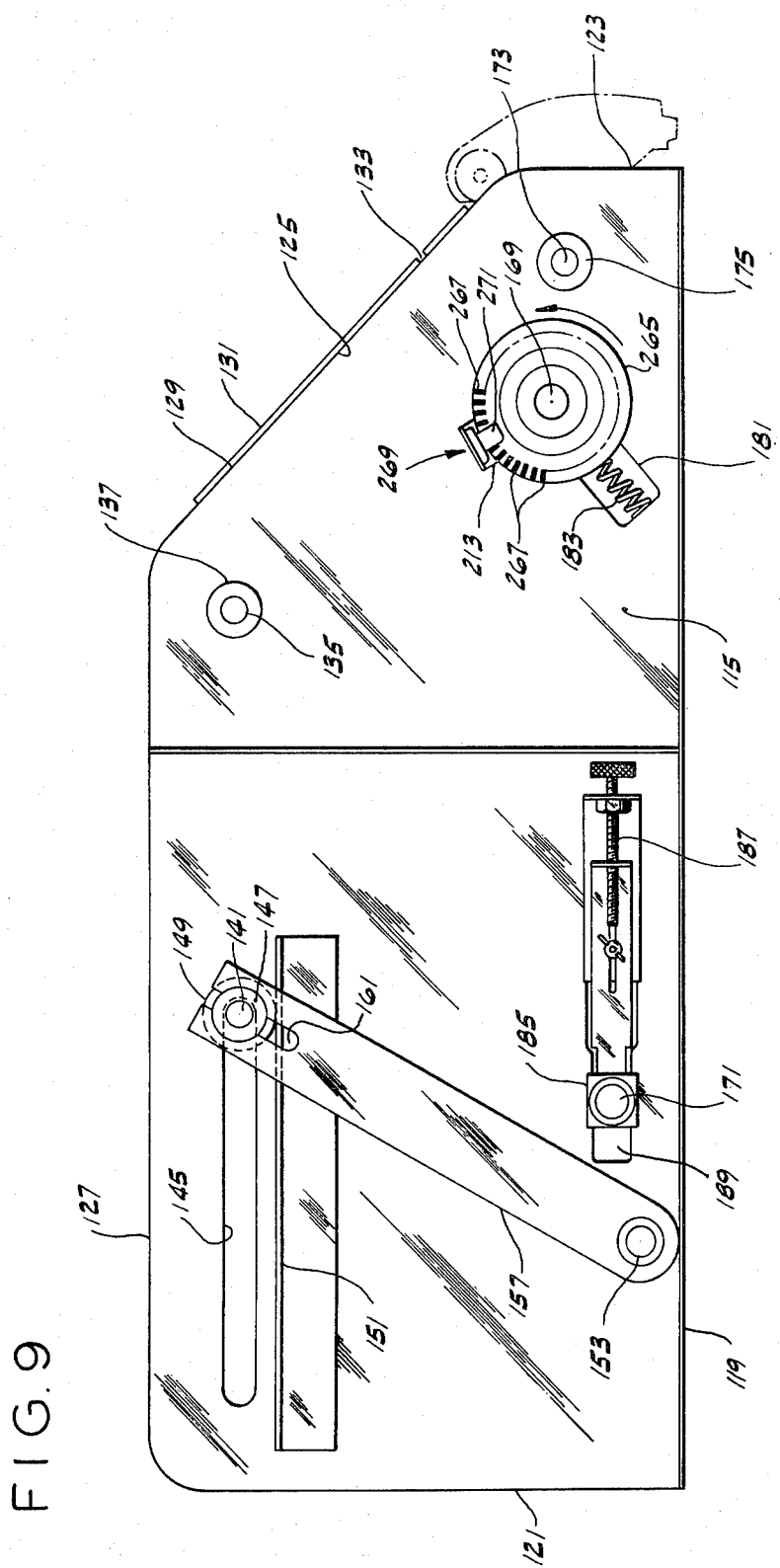
FIG. 9 is a left side elevation of FIG. 6 with a side cover removed.

The measuring roll 169, being pressed against the outside of the belt, is driven by the belt in clockwise direction as viewed in FIGS. 10–12 and thus the optically encoded disk 265 on the left end of the measuring roll shaft is rotated counterclockwise as viewed in FIG. 9. This rotation is in direct proportion to the travel of the belt and in direct proportion to the length of fabric unwound, since the belt travel is equal to the length of fabric unwound. As previously noted, sixty-four of the marks 267 correspond to one-eighth yard of belt travel and one-eighth yard of fabric unwound. Conveniently, the disk 265 has a total of sixty-four of the marks 267 around its margin, and the measuring roll 169 is dimensioned to rotate one revolution for one-eighth yard travel of the belt. Thus, each one-eighth yard of belt travel, which effects unwinding of one-eighth yard of fabric, causes disk 265 to rotate one revolution.

As the disk 265 rotates, the opaque marks 267 interrupt the passage of light from the light source 271 to the light detector 273 of the pulse generator 269, and each interruption generates a pulse on line 333 (see FIG. 15) to the Schmitt trigger 313. The latter provides an output signal on line 335, with each input received from pulse generator 269, to the count enable circuit 311. The latter does not provide an output until the leading edge of the fabric being dispensed covers the lower row of photocells or light sensors 209 pocketed in panel 129. When both sensors 209 are covered by fabric, they supply enabling inputs via lines 337 and 339 to the count enable circuit 311, and the latter starts supplying an output on line 341 for each input received from Schmitt trigger circuit 313. Count enable circuit 311 constitutes means controlled by sensing means, i.e. sensors 209, for starting operation of measuring means, i.e. counters 309 and 307, to begin measuring the length of material fed by belt 103 from bolt B in response to the arrival of the leading edge of the material at a reference position, i.e. line 207.

The outputs of the count enable circuit 311 are applied as inputs to the one-eighth yard counter 309. Since, as noted, the passage of the sixty-four opaque markings 267 on disk 265 between the light source 271 and light detector 273 of pulse generator 269 is equivalent to the dispensing of one-eighth yard of fabric, counter 309 counts sixty-four inputs from count enable circuit 311 and then supplies an output pulse on line 343. Counter 309 then resets and begins a new counting cycle.

Each output from counter 309 initiates a yardage comparison and a price computation. The contents of yards counter 307 are incremented one-eighth yard by each pulse on line 343, which pulse is also provided as a shift input to both the yards counter 307 and a preset yardage register 345. After the yards counter 307 increments its contents by an additional one-eighth yard, the new result is shifted from counter 307 via line 346 through an And gate 347 to the comparator 305. The And gate 347 has two inputs, one from the yards counter 307 and the other from the 0 output of a flip-flop 349. Unless an inventory function is being performed, as will be discussed, the 0 output of flip-flop 349 on line 351 is high, which permits And gate 347 to pass the contents of yards counter 307 to the comparator 305. The yards counter 307 contents are also provided on line 346 to a display/interface circuit 353 which controls three light emitting diodes that make up the yardage dispensed display 251.

The contents of the preset yardage register 345 are determined by the setting of the three thumbwheel switches of the yardage preset means 247. When the output of the one-eighth yard counter 309 is supplied to the shift input of the register 345, the contents are supplied on line 355A to comparator 305 and simultaneously are fed back on line 355B to the load input of register 345 to be restored therein. Comparator 305 compares the contents supplied from yards counter 307 and register 345 and, if they are unequal, no output is provided. When the values are equal, which means that the preset yardage has been dispensed, comparator 305 supplies a pulse on line 357 to one input of an Or gate 359 to make its input momentarily high. This high input to Or gate 359 makes its output on line 361A to the S input of a flip-flop 363 momentarily high, which sets flip-flop 363 and makes its 1 output on line 365A high to one input of an Or gate 367. With a high input on line 365A, this Or gate 367 provides a high output on line 369 to the stop input of motor control circuit 303, causing power to be removed from motors 191 and 197 and stopping the dispensing of fabric. This condition exists until the next time push button switch 259 is actuated, at which time an input is provided on line 329B to the R input of flip-flop 363. This input resets flip-flop 363 and the 1 output changes from high to low and results in the removal of the high level to the stop input of motor control circuit 303. This input on line 329B will also reset flip-flops 371 and 373.

Concurrently with the yardage comparison just described, the output of the one-eighth yard counter 309 on line 343 is received by the S input of flip-flop 315 which sets flip-flop 315 and makes its 1 output high on line 375 to one input of an And gate 377. When this occurs, pulses on line 379A from clock 317 are passed by And gate 377 and become shift inputs on line 381A to shift register 319 and inputs on line 381B to a counter 383. Counter 383 counts 125 of the pulses provided by clock 317 each time flip-flop 315 is set and then supplies an output on line 385A to the R input of flip-flop 315 as well as an input on line 385B to reset itself. When flip-flop 315 receives the R input, it resets, and the 1 output thereof goes from high to low, thus preventing the passage of any additional pulses by And gate 377.

While counter 383 is counting 125 pulses, each of these same pulses causes the contents of shift register 319 to be transferred on line 387A to the input of total price register 321 and to be simultaneously fed back on line 387B to the load input of shift register 319 to restore the contents thereof prior to the next shift input.

Each time the contents of shift register 319 are supplied to total price register 321, the addition portion of total price register 321 combines this input with the present content of register 321 to calculate a new total price which is stored in register 321. After each addition, the contents of the total price register 321 are supplied on line 389 to a display interface circuit 391 which controls five light emitting diodes that make up the total price display 253. Since 125 additions of the price per yard value to the contents of total price register 321 are performed for each indication of one-eighth yard of fabric dispensed, the contents of the total price register 321 are shifted three decimal places to the right before the total price is displayed. This shifting function is performed within register 321. This is done because 125 is equal to $\frac{1}{8}$ of 1000, so that for every eight one-eighth yard indications the price per yard of fabric will have been, in effect, added to itself 1000 times and by shifting the result three places to the right, this yields 1.00. This means that 1000 additions of the contents of shift register 319 to the prior contents of total price register 321 are equivalent to adding the price per yard of material to the total computed price each time one additional yard of fabric is dispensed.

When the motors 191 and 197 stop, their brakes are applied relatively quickly to bring the belt 103 to a stop to stop the unwinding of the fabric. While the belt may have started unwinding the fabric and feeding it downwardly under the sensor panel 129 before the leading edge of the fabric reached the reference line 207 of the light sensors 209, the measuring operation did not start until the leading edge of the fabric covered the light sensors 209 on line 207 just above the cutting groove 133. Hence, the motors 191 and 197 run to drive the belt to feed the preset yardage (whatever it may be) past said line 207 (and for practical purposes past the cutting groove). The fabric feeds downward off the panel 129 and is accumulated in folds in the pan 233. When the preset yardage has been fed past the groove, the belt 103 stops to stop the fabric feed, and the clerk may then cut the fabric with a scissors, using the groove as a guide, to provide the customer with the requested yardage. The provision of the sensors 209 slightly above the groove has the advantage that it introduces a compensation for coasting of the belt (due to inertia of the conveyor belt system) which would otherwise tend to feed slightly more fabric than the preset yardage. It is possible to introduce some compensation for coasting via the circuitry, by offsetting the initial length counter value by an amount corresponding to the expected coasting.

Before dispensing any fabric, the clerk may precalculate the total cost of a desired length of fabric, i.e., she may use the system simply as a calculator for this purpose. For such precalculation, she simply sets the thumbwheel switches of the yardage preset means 247 to the requested yardage, and sets the thumbwheel switches of the price setting means 249 to the price per yard of the selected fabric. Then, after checking to see if the signal light 255A is on, she actuates push button switch 255 to start a price computation, and the result is displayed at 253. This precalculation feature is operable only if the leading edge of fabric to be dispensed is not laid over the upper row of light sensors 215. When these sensors are open to the ambient light, the output of motor enable circuit 301 is low, below the enabling input required by motor control circuit 303 to energize motors 191 and 197. However, the low output of motor enable circuit 301 on line 327B is converted by an inverter 393 to cause signal light 255a to be energized and the output of motor enable circuit 301 on line 327C is converted by an inverter 395 to provide a logic high to one input of an And gate 397. On actuation of push button switch 255, a momentary high is applied to the other input of And gate 397, resulting in a momentary high output from And gate 397 on line 399 to the S input of a flip-flop 401. This high input sets flip-flop 401, making the 1 output thereof high on line 403 to one input of an And gate 405. The other input of And gate 405 is supplied by pulses from clock 317 on line 379B. With the 1 output of flip-flop 401 high, And gate 405 passes the pulses supplied by clock 317 to the input of the one-eighth yard counter 309.

The pulses supplied through And gate 405 to counter 309 are acted upon by counter 309 in the same way as inputs received from the count enable circuit 311 when fabric is being dispensed. Thus, for every sixty-four pulses received, counter 309 supplies an output pulse on line 343 representative of one-eighth yard of fabric dispensed. These outputs from 309 initiate the yardage comparison and price computation functions previously discussed with the appropriate yardage and total price outputs being displayed at 251 and 253, respectively. Finally, the contents of yards counter 307 will equal that of register 345, and comparator 305, as before, will provide an output on line 357 to Or gate 359. The output of Or gate 359 is provided on line 361B to the R input of flip-flop 401. When this occurs, flip-flop 401 resets and the 1 output thereof goes low, which disables And gate 405 from passing any further pulses from clock 317 to the input of one-eighth yard counter 309. The yardage dispensed display 251 will indicated the desired yardage and the total price display 253 will indicate the total cost of this yardage.

As above noted, the precalculate feature is operative only when the upper light sensors 215 are not covered. Once sensors 215 are covered, motor enable circuit 301 supplies the high enabling output on line 327A to motor control circuit 303, which output is converted by inverters 393 and 395 to "turn off" signal light 255a, and provide a logic low to And gate 397 so that And gate 397 is no longer responsive to push button switch 255 being actuated to initiate a price calculation.

The apparatus may also be utilized for inventory purposes to determine the length of fabric on a bolt. This is carried out by cradling the bolt in the loop L, laying the leading end portion of the fabric on the panel 129 to cover the upper sensors 215 (so that circuit 301 supplies an enable input to circuit 303 to enable operation of motors 191 and 197), and then actuating push button switch 257. This provides a signal to the start input of motor control circuit 303, and power is applied to motors 191 and 197. Fabric is dispensed as before, and pulse generator circuit 269 begins supplying pulses through Schmitt trigger circuit 313 and count enable circuit 311 to one-eighths yard counter 309 in the manner previously described. The output of one-eighths yard counter 309 increments yards counter 307 as noted. However, the output of yards counter 307 is now prevented from being an input to comparator 305. This condition occurs because when push button switch 257 is actuated, it supplies a signal on line 407 to the T input of flip-flop 349. Flip-flop 349 has normal outputs of 0 high and 1 low. A signal to the T input of flip-flop 349 triggers the flip-flop, and the outputs become 0 low and 1 high. With the 0 output on line 351 to one input of And gate 347 low, And gate 347 is prevented from passing the output of yards counter 307 to comparator 305. This is the opposite of what occurs in a dispense, measure and calculate operation. Thus, the contents of yards counter 307 are not compared with the contents of register 345, and the output of yards counter 307 is provided only to the display/interface circuit 353, so that yardage dispensed is indicated on the yards measured display 251.

When unwinding of the fabric is to be terminated, push button switch 257 is again actuated, and a second signal is applied to the T input of flip-flop 349. This second input triggers flip-flop 349 again and the 0 output changes to high and the 1 output to low. The 1 output of flip-flop 349 is provided on line 409 to an inverter 411, which converts the low 1 output to a high, and applies this high to one input of an And gate 413. The other input to And gate 413 is the output provided by the one-eighths yard counter 343. Until the inverted 1 output of flip-flop 349 to the input of And gate 411 goes high, the outputs of the one-eighth yard counter 309 cause no change in the low output of And gate 413. Now, however, the next output of counter 309 makes both inputs to And gate 413 high, and its output will change from low to high. The high output of And gate 413 is provided on line 415 to an inhibit circuit 417. Circuit 417 is actuated by an input on line 419 to inhibit the output of And gate 413 only when push button switch 259 is actuated to initiate a dispense/measure/calculate operation. Since this does not occur in an inventory, circuit 417 is not inhibited and the high output of And gate 413 is provided on line 421 to an input of Or gate 359, making the output of Or gate 359 high. As noted previously, when the Or gate 359 output goes high, it provides an input to set flip-flop 363. The 1 output of flip-flop 363 goes high when flip-flop 363 is set, thus making the input on line 365A to Or gate 367 high, which results in Or gate 367 supplying a high output on line 369 to the stop input of motor control circuit 303. This effects the removal of power from motors 191 and 197. This dispensing operation is thereupon terminated and the yards measured display 251 indicates the total yardage of fabric dispensed.

Three additional features of the present invention are a price per yard lockout during dispensing, a pause capability, and a shutdown or panic bar power removal capability.

The price per yard lockout feature includes the inhibit circuit 423 through which the price per yard contents are loaded into shift register 319. Inhibit circuit 423 is actuated when push button switch 259 is actuated. When actuated, it prevents any changes in the thumbwheel switch settings of the price per yard input 249 from being transferred to shift register 319.

The pause feature enables dispensing to be manually stopped during any dispensing operation. While fabric is being dispensed, actuation of the pause push button switch 263 will provide a signal to the T input of flip-flop 373. This input will trigger flip-flop 373 to make it 0 output low and its 1 output on line 425 high to one input of an And gate 427. When the next output of one-eights yard counter 309 occurs, both inputs to And gate 427 are high, and And gate 427 supplies a high output on line 429 to the S input of a flip-flop 431. This input sets flip-flop 431, making its 1 output high on line 433A to Or gate 367. The output of Or gate 367 on line 369 to the stop input of motor control circuit 303 goes high and power is removed from motors 191 and 197 to stop the dispensing operation.

To restart the dispensing operation, pause push button switch 263 is actuated a second time. This applies a second signal to the T input of flip-flop 373 which triggers flip-flop 373 again, making the outputs of flip-flop 373 1 low and 0 high. The high 0 output of flip-flop 373 is supplied on line 435 to the R input of flip-flop 431. Flip-flop 431 is reset, and the 1 output of flip-flop 431 goes low, removing the high input to Or gate 367 and the resulting high output of Or gate 367 to the stop input of motor control circuit 303. Power is reapplied to motors 191 and 197 and dispensing is recommenced.

The panic feature includes the switch 261, which is installed so that, whenever hood 223 is swung out, the switch 261 is actuated to stop the operation instantly in the event, for example, of a foreign object being caught between the rolls. Whenever switch 261 is actuated, a signal is supplied on line 437 to the S input of a flip-flop 371. This input sets flip-flop 371 and the 1 output thereof goes high on line 433B and 433A to one input of Or gate 367. With one input of Or gate 367 high, the output of Or gate 367 to the stop input of motor control circuit 303 goes high, removing power from motors 191 and 197. Flip-flop 371 will remain set until hood 223 is returned to its normal position and either of push button switches 257 or 259 is actuated. The actuation of either of these switches will supply a reset signal as noted on line 329B to the R input of flip-flop 371 to reset the flip-flop. This 1 output of flip-flop 371 goes low upon reset of the flip-flop and removes the high to the stop input of motor control circuit 303 supplied by Or gate 367.

If switch 261 is actuated prior to the completion of a dispensing operation, a signal is supplied by a clear circuit 439 to clear or reset the contents of yards counter 307 and total price register 321. This means that material dispensed must be rewound on its bolt and the dispensing operation repeated. If, however, dispensing has been completed, then clear circuit 439 is not actuated and the yardage and price information in yards counter 307 and total price register 321 are displayed as before.

Clear circuit 439 is actuated by the output of an And gate 441 whose inputs are the 1 output of the flip-flop 371 controlled by microswitch 261, and the inverted 1 output of flip-flop 363, whose state is controlled by the output of comparator circuit 305 through Or gate 359. If switch 261 is actuated prior to the completion of dispensing the 1 output of flip-flop 363 is low and this is converted by an inverter 443 to a high input to And gate 441. The 1 output of flip-flop 371 goes high when flip-flop 371 is set by the actuation of switch 261. This makes both inputs to And gate 441 high and makes the output of And gate 441 high on line 445 to clear circuit 439, which causes a reset. If the requested yardage is already dispensed, the 1 output of flip-flop 363 is high and this is converted by inverter 443 to a low input to And gate 441, thus preventing the actuation of clear circuit 439 when hood 223 is swung out and switch 261 is actuated.

With the motor 191 providing a positive drive and a positive brake for the upper front roll 111 and with the motor 197 providing a positive drive and an impositive brake for the upper rear roll, the proper loop L is maintained and the belt is maintained relatively taut in its reach behind the sensor panel 129, its lower reach from roll 167 to roll 171 and its rear reach from roll 171 to roll 109. It is important that the belt be kept taut (outside the loop L) to insure the necessary contact between the belt and the measuring roll 169 for accurate measurement (i.e., for a one-to-one ratio of belt travel and the distance moved by a point on the surface of the roll 169), and also to keep the belt tracking properly on its guide rolls without undue lateral shift. In this regard, the roll 169 may have an appropriate rough finish (e.g., a sand-blasted finish) for good frictional contact with the belt. The motors normally run substantially at the same speed to drive rolls 109 and 11 at substantially the same speed so that the roll 109 moves the belt into the loop L at approximately the same speed as the belt is pulled out of the loop by the roll 111 (which is driven by the main drive motor 191). However, if there is any slack in the belt from roll 111 around to roll 109, the load on the motor 197 is less than the load on the motor 191 and the motor 197 speeds up in respect to the motor 191 to cause the upper rear roll 109 to overrun the upper front roll 111 and thereby pull forward the portion of the belt which extends from roll 111 to roll 109 to take out the slack. The slack taken out of the belt from roll 111 to roll 109 is put into the loop L properly to maintain the loop. The positive braking of the upper front roll 111 on deenergization of the motor 191 positively stops the upper front roll. The impositive braking of the upper rear roll 109 on deenergization of the motor 197 provides braking action to stop the motor 197 and the upper rear roll 109 when motor 197 is deenergized, as is particularly significant if the motor is deenergized when roll 109 is moving forward, at which time the load on the motor is somewhat less than when the roll is moving rearward, while enabling the rear roll to overrun the upper front wall and thus pull slack out of the portion of the belt from roll 111 to roll 109.

With the upper rear roll 109 movable as shown, a bolt B placed in the loop L of the belt is automatically cradled, according to its size and weight, at the proper angle for being fed smoothly and uniformly off the bolt, maintaining contact between the bolt and belt so that belt travel and length of fabric unwound are equal, enabling measurement of belt travel to measure the length of fabric unwound. The action with the movable upper rear roll is such as smoothly to unwind the bolt despite the elongate cross section of the bolt.

While the apparatus 101 as above described is particularly useful for dispensing fabric from a bolt, it will be understood that various features of the apparatus may be useful for dispensing material other than fabric from a supply, e.g., a wound supply, the belt 103 constituting means for feeding material from the supply and more specifically constituting means for unwinding the wound supply.

In the event a greater yardage of fabric is requested than remains on a bolt, once the trailing end of the fabric passes by and uncovers the upper light sensors 215, the motors 191 and 197 stop to stop the drive for the belt and thereby stop the fabric from being fed farther downward. The fabric stops at the one-eighth yard interval which is in progress. Since the two rows of sensors 209 and 215 are one-eighth yard apart, the trailing edge of the fabric does not travel past the cutting groove. The fabric remains pinched between rolls 221 and 167.

While the measuring roll 169 is herein illustrated as engaging the outside of the belt at the roll 167, it will be understood that the location of the measuring roll could be changed to engage the outside of the belt at the upper front roll 111 or possibly elsewhere.

While reference is above made to yards and yardage, it will be understood that the principles of the invention are applicable to apparatus carrying out measurement of length in the metric system, and the term "yardage" is intended broadly to include lenghts measured in the metric system as well as in actual yards.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for dispensing fabric from a bolt comprising an endless belt conveyor, means guiding the conveyor for travel in an endless path including an upwardly opening loop in which a bolt may be cradled with the bolt extending transversely of the conveyor, means for driving the conveyor to rotate a bolt cradled in the loop to unwind fabric from the bolt, said guiding means including a first and a second guide for establishing said loop, the conveyor travelling over the first guide, thence downwardly, upwardly and over the second guide, said apparatus having means mounting said guides for relative movement toward and away from one another as the bolt rotates, said guides being relatively movable away from one another as the bolt rotates to a horizontal position and toward one another as the bolt rotates away from horizontal position, means for measuring the travel of the endless belt conveyor as a measure of the length of fabric unwound from the bolt, means for starting the endless belt conveyor, means for starting operation of the measuring means in response to arrival of the leading edge of the fabric at a reference position, means controlled by the measuring means for stopping the endless belt conveyor upon unwinding of a predetermined length of fabric from the bolt, the means for stopping the endless belt conveyor including means for presetting the length of fabric to be dispensed, means for setting the price per unit length of the fabric to be dispensed, and means controlled by said price setting means and said measuring means for calculating and indicating the price of the length of fabric dispensed.

2. Apparatus as set forth in claim 1 having means for operating the price calculating means without operating the endless belt conveyor. starting 3. Apparatus for dispensing material from a supply thereof, comprising means for feeding material from the supply, means for measuring the length of material fed by the feeding means from the supply, means for presetting the length of material to be dispensed, means for setting the price per unit length of the material, means for starting the feeding means, said feeding means being controlled by said feed starting means, means controlled by the material for sensing the arrival of the leading edge of the material at a reference position as the material is fed forward by the feeding means following the starting of the feeding means, means controlled by said sensing means for starting operation of the measuring means to begin measuring the length of material fed by the feeding means in response to the arrival of the leading edge of the material at the reference position, means controlled by the measuring means for stopping the feeding means when the preset length has been fed past said reference position, and means controlled by said price-setting means and said measuring means for calculating and indicating the price of said preset length.

4. Apparatus as set forth in claim 3 having means for operating the price calculating means without operating the feeding means.

5. Apparatus as set forth in claim 3 having means for indicating the length of material dispensed.

6. Apparatus as set forth in claim 5 having means for operating the feeding means and the length indicating means without operating the price calculating means.

7. Apparatus for dispensing fabric from a bolt comprising an inclined panel over which the fabric is fed, said panel having a groove for guiding a cutting instrumentality to cut the fabric on a line extending transversely across the fabric, means for unwinding the fabric from the bolt and feeding it down over the panel comprising an endless belt, means guiding the belt for travel in an endless path including an upwardly opening loop in which a bolt may be cradled with the bolt extending transveresly of the belt, means for driving the belt to rotate a bolt cradled in the loop to unwind fabric from the bolt and feed it down over the panel, said guiding means comprising an upper rear and an upper front guide roll for establishing said loop, said panel extending forwardly and downwardly from said upper front guide roll, the conveyor travelling over the upper rear guide roll, thence downwardly, upwardly and over the upper front guide roll and thence downwardly behind the panel, means mounting said upper rear guide roll for movement toward and away from the upper front guide roll, means for measuring the length of fabric unwound from the bolt comprising a measuring roll engaging the outside of the belt and driven by the belt, means for presetting the length of fabric to be dispensed, means for starting operation of the measuring means in response to arrival of the leading edge of the fabric generally at the groove, means controlled by the measuring means for stopping the belt upon unwinding of said preset length of fabric, means for setting the price per unit length of the fabric to be dispensed, and means controlled by said price setting means and said measuring means for calculating and indicating the price of the length of fabric dispensed.

8. Apparatus as set forth in claim 7 wherein said measuring means includes an optically encoded disk rotatable with the measuring roll and means associated with the disk for generating a predetermined number of pulses for a fraction of said unit length of fabric dispensed.

* * * * *